United States Patent Office 3,733,303
Patented May 15, 1973

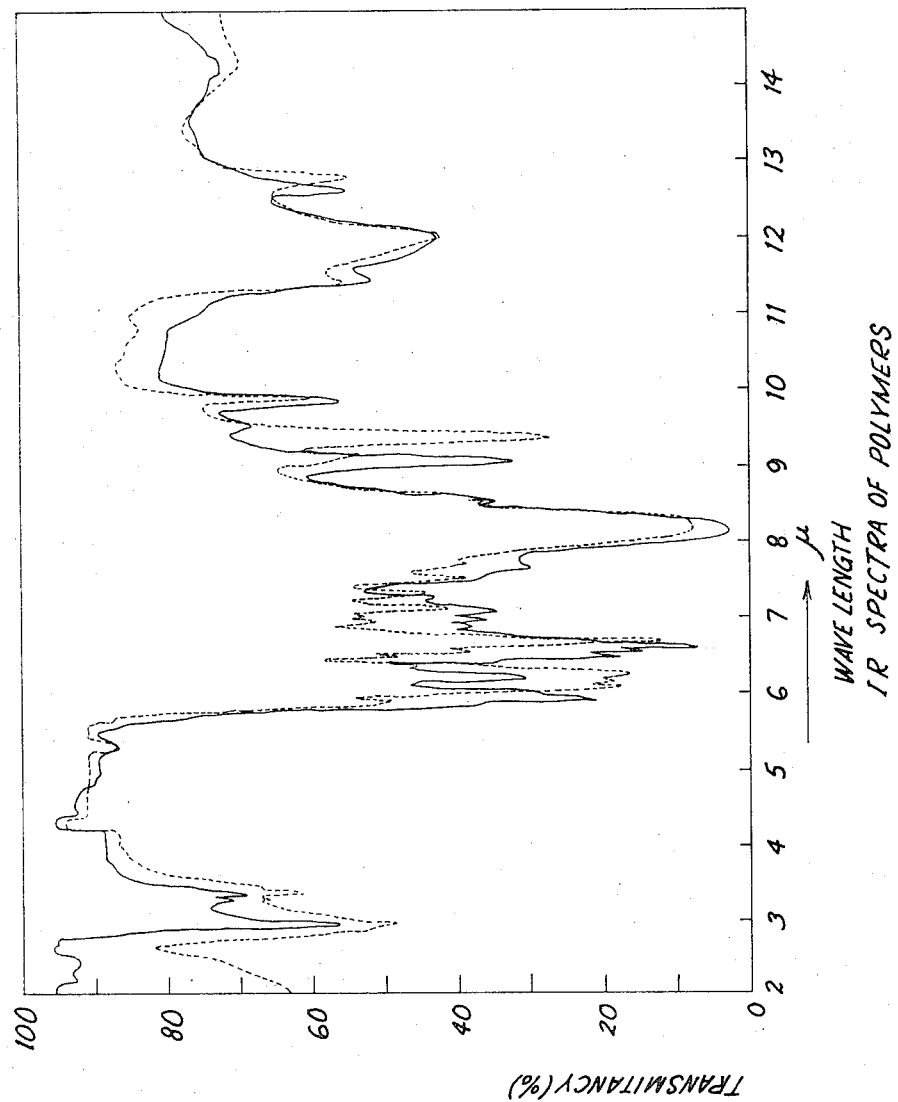

3,733,303
HIGH POLYMER HAVING THE STRUCTURE OF POLY-[IMINO(2,5 - DIALKOXYCARBONYL - 1,4-PHENYLENE) IMINOALKYLENE]
Kazuo Adachi, Akira Tai, and Fukuji Higashi, Tokyo, Japan, assignors to Tekkosha Co., Ltd., Tokyo, Japan
Filed Oct. 18, 1971, Ser. No. 189,876
Claims priority, application Japan, Oct. 20, 1970, 45/91,668
Int. Cl. C08 33/02
U.S. Cl. 260—47 CP
7 Claims

ABSTRACT OF THE DISCLOSURE

A new high polymer comprising recurring structural units of the formula

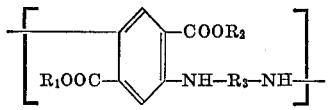

is obtained by the oxidation of high polymer comprising recurring structural units of the formula

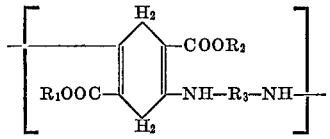

which may be derived from a reaction between dialkylsuccinyl succinates and aliphatic diamines, and said new high polymer compound is a thermo plastic resin being characterized by spectroscopic absorption IR spectra at the vicinities of 2.80, 5.80, 6.49, 11.5 and 12.7$\mu$, which is conveniently employed as a coating for metals, films, sheets and as various shaped moldings.

BACKGROUND OF THE INVENTION

Field of the invention

The present invention relates to a high polymer which is obtained by the oxidation of high polymer comprising recurring structural units of the formula

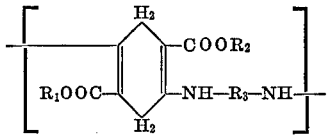

wherein $R_1$ and $R_2$ represent $C_1$–$C_4$ alkyl radicals, $R_3$ represents a member selected from the group consisting of $C_4$–$C_{12}$ alkylene radicals,

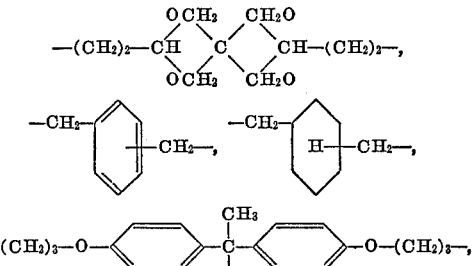

and

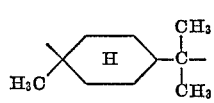

Description of the prior art

Heretofore, it has been known that the high polymer comprising recurring structural units of the formula

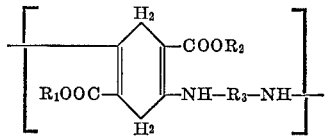

wherein $R_1$ and $R_2$ represent alkyl radicals, $R_3$ represent alkylene radicals, can be obtained by the reactions between corresponding dialkylsuccinyl succinates and diamines. This high polymer is the subject matter of our copending patent application Ser. No. 11,667 filed Feb. 16, 1970, now Pat. No. 3,635,888. However, high polymers which are obtained by oxidizing the latter high polymer are not known.

SUMMARY OF THE INVENTION

A main object of this invention is to provide a new high polymer (hereinafter referred to as polymer (I)) comprising recurring structural units of the formula

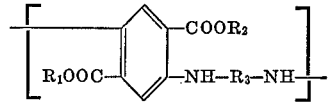

wherein $R_1$ and $R_2$ represent $C_1$–$C_4$ alkyl radicals, and $R_3$ represents a member selected from the group consisting of $C_4$–$C_{12}$ alkylene radicals,

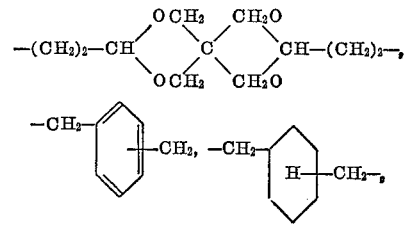

and

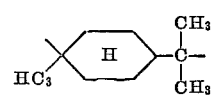

Another object of this invention is to provide a high polymer which is obtained by oxidizing the high polymer comprising recurring structural units of the formula

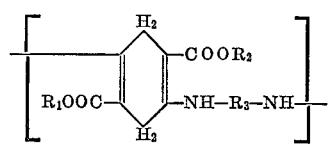

(hereinafter referred to as polymer (II)) which is obtained by the condensation reaction between succinyl succinates having the general formula of

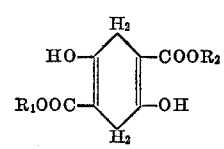

wherein $R_1$ and $R_2$ represent $C_1$–$C_4$ alkyl radicals and diamines having the general formula of

wherein $R_3$ represents a member selected from the group consisting of $C_4$-$C_{12}$ alkylene radicals,

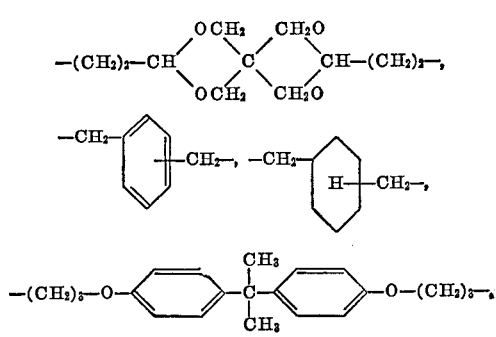

and

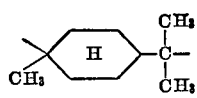

A further object of this invention is to provide a new thermoplastic resin which shows good resistance to heat, acids and alkalies, as well as to dielectric breakdown, and has excellent properties of strong adhesion, good electric insulation and the like.

A still further object of this invention is to provide a process for producing a new high polymer, polymer (I), by oxidizing the precursor high polymer, polymer (II).

BRIEF DESCRIPTION OF THE DRAWING

FIG. 1 shows the IR spectrum of a typical polymer of this invention which is obtained by oxidizing the polymer derived from the reaction between diethylsuccinyl succinate and hexamethylene diamine (the first polymer is hereinafter referred to as polymer ($I_1$) and the second as polymer ($II_1$)). The solid line shows the IR spectrum of polymer ($I_1$) and the dashed line shows that of the polymer ($II_1$).

DETAILED EXPLANATION OF THE INVENTION

The high polymer substance, polymer (I), of this invention shows characteristic IR absorption at 2.80, 5.80, 6.49, 11.5 and 12.7$\mu$ as seen from the illustrated IR spectrum of the polymer ($I_1$) in FIG. 1.

That is, the absorption at 6.05$\mu$ and 6.25$\mu$ in the polymer ($II_2$), which are due to the stretching of the ester carbonyl strongly bonded with the amino radical by a hydrogen bond and conjugated with double bond of the cylohexadiene skeleton, and to the stretching of the double bond conjugated with the carbonyl radical, respectively, disappear in the polymer ($I_1$). Instead of these, the IR absorption at 5.80$\mu$ and 6.49$\mu$, which are due to the stretching of carbonyl in the aromatic carboxylic acid ester and to the stretching of the aromatic double bond in tetra-substituted benzene compound, respectively, appear.

Furthermore, the existence of benzene ring in polymer (I) is obviously confirmed by the characteristic absorption at 11.5$\mu$ due to the C—H bending vibration out of plain inherent in 1,2,4,5-tetra-substituted benzene compound. This absorption is not observed in polymer (II).

All the above characteristics are also commonly observed in the high polymers of this invention which are prepared by using diamines other than hexamethylene diamine. Therefore, it is, obviously recognized that the polymer (I) of the present invention is a new high polymer which comprises benzene skeleton combined with two bivalent organic residues by amine linkages, and has not been known in the past.

Consequently, it is confirmed that the high polymer, polymer (I), of the present invention, comprises recurring structural units of the formula

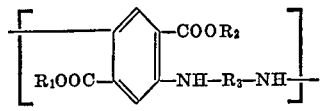

Elementary analyses of the polymer (I) give results substantially in accord with the calculated values based on the above structure.

The conversion reaction of polymer (II) to polymer (I) may be explained by the following equation;

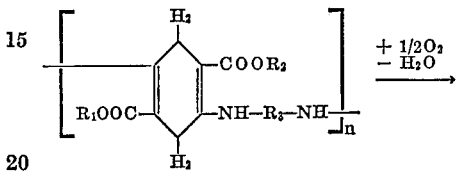

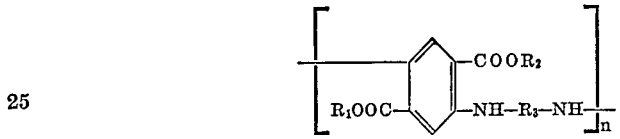

According to the present invention, polymer (I) may be obtained from polymer (II) by the oxidation of the polymer powder with air under a fluidized state at a temperature of 80–200° C., preferably 120–180° C., or with an oxidizing agent such as benzoquinone sodium nitrobenzene-m-sulfonate, chloranil, iodine or the like under dispersed condition in polar organic solvent such as methanol, ethanol, ethylene glycol, dimethylformamide, dimethylsulfoxide or the like.

The polymer (II) used in the present invention may easily be prepared from dialkylsuccinyl succinate and diamine which result in the polymer (II) according to the equation of

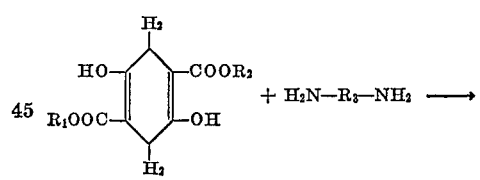

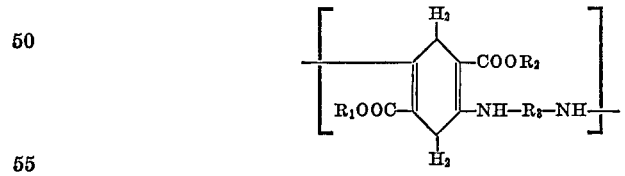

by heating both components after dissolving them in a organic solvent which is inert for the condensation reaction thereof. The moldings made from the high polymer of the present invention are obtainable by the pressure molding of the resultant polymer powder at a somewhat lower temperature than the melting point thereof.

The polymer (I) of the present invention shows the following unique and excellent electrical properties which have not been observed in traditional resins produced by the process of polycondensation reaction;

Specific resistance: Not less than $10^{15}$ Ω/cm.
Dielectric constant: Not more than 2.3 (at $10^3$ Hz.)
Dielectric loss: Not more than $2.5 \times 10^{-3}$ (at $10^3$ Hz.)

The above listed dielectric constant and dielectric loss of the polymer (I) are substantially constant in the temperature range of 0–200° C. It is possible to select a suitable diamine as the raw material of the polymer (II) from the available ones so as to regulate the melting point of the finally resulting polymer (I) to substantially the desired value which may distribute over a wider temperature range. Furthermore, the mechanical properties of this new polymer (I) can also be regulated such that the mechanical strength of from rigid to very plastic may be attainable by the same way as above.

PREFERRED EMBODIMENTS OF THE INVENTION

The present invention is further illustrated in detail in the following non-limitative examples. The expression "parts" represents "parts by weight" of each of the materials used. The measurement of the dielectric properties were carried out at 1 kHz.

EXAMPLE 1

A polymerization reaction was carried out by heating a mixture of 2.56 parts of diethyl succinylsuccinate and 1.16 parts of hexamethylene diamine in 20 parts of dimethyl formamide at 120° C. for 4 hours with stirring in a nitrogen atmosphere. The resulting polymer solution was poured into 60 parts of cold water to form a dispersion of the polymer. The polymer having pale red color was separated from the dispersion by filtering and then dried. The thus isolated polymer showed characteristic IR-absorptions at 13.1, 8.20, 6.01, 6.20 and 3.10$\mu$, which is inherent to the polymer (II$_1$). This polymer (II$_1$) power was oxidized with air under a fluidized state at 100° C. for 2 hours to form deep red powder. The resulting powder which shows characteristic IR-absorptions at 2.80, 5.80, 6.49 and 12.70$\mu$ was determined to be the polymer (I$_1$) of this invention.

A tough and impact resistant resin molding was obtained by pressure-molding of thus obtained polymer (I$_1$) powder under the pressure of 10 kg./cm.$^2$ at 180° C. using a metallic molding device coated with polytetrafluoroethylene resin.

EXAMPLE 2

The polymerization and the subsequent isolation of the resulting polymer (II) was carried out in the same manner as in Example 1, except for using 1.743 parts of diethyl succinyl-succinate and 0.985 parts of octamethylene diamine in place of 2.56 parts of diethyl succinylsuccinate and 1.16 parts of hexamethylene diamine, respectively. Thus isolated pale red polymer (II) powder was oxidized in the same manner as in Example 1, and then the red polymer (I) powder was formed. A flexible resin molding was obtained by a pressure-molding of the thus formed polymer (I) powder under the pressure of 10 kg./cm.$^2$ at 150° C. using a metallic molding device coated with polytetrafluoroethylene resin.

EXAMPLE 3

In 10 parts of ethylene glycol was dispersed 1 part of the polymer (II) powder obtained in Example 1. With the addition of 1.5 parts of benzoquinone, the dispersion was heated at 100° C. for 2 hours to form a red slurry. The red polymer (I) powder was obtained by filtering the resulting red slurry, washing well the cake with methanol, and then drying. A solution prepared by dissolving the polymer (I) powder into N-methyl pyrrolidone was doctored onto a glass plate to cast a knife-coater. Evaporation of the solvent and stripping of the dry film gave a red flexible film of the polymer (I). The physical properties of this film were as follows:

Melting point: 160° C.
Tensile strength: 9.5 kg./mm.$^2$
Elongation: 9.5%
Specific volume resistance: $10^{15}$ $\Omega$/cm.
Dielectric constant: 2.3
Dielectric loss: $2.5 \times 10^{-3}$

EXAMPLE 4

One part of the polymer (II) obtained in Example 2 was dispersed together with 0.5 part of iodine into 25 parts of methanol and the resulting dispersion was heated to reflux until a red slurry was formed. The polymer (I) powder being identical with that in Example 2 was obtained by filtering the slurry, washing with methanol and drying. By subjecting the resulting polymer (I) powder to pressure-molding under the same condition as in Example 2, a flexible resin molding was formed.

EXAMPLE 5

The polymerization and the subsequent isolation of the resulting red polymer (II) was carried out in the same manner as in Example 1, except for using 0.573 part of diethyl succinyl-succinate and 0.614 part of 3,9-bis(3-aminopropyl) - 2,4,8,10 - tetroxaspiro(5,5)-undecane in place of 2.56 parts of diethyl succinylsuccinate and 1.16 parts of hexamethylene diamine, respectively. Thus isolated red polymer (II) was oxidized in the same manner as in Example 1, and then the red polymer (I) powder was formed. Prepregs were formed by impregnating into glass textures a solution of the polymer (I) powder dissolved in N-methyl pyrrolidone and by heating the resulting impregnated glass textures at 150° C. Rigid and tough pray boards of resin impregnated glass were obtained by pressing the piles of the thus resulting prepegs under the pressure of 10 kg./cm.$^2$ at 180° C.

EXAMPLE 6

The polymerization and the subsequent isolation of the polymer (II) was carried out in the same manner as in Example 1, except for using 4.24 parts of dioctyl succinylsuccinate and 1.24 parts of hexamethylene diamine in place of diethyl succinylsuccinate and 1.16 parts of hexamethylene diamine, respectively. Thus isolated red polymer (II) was oxidized in the same manner as in Example 4. The resulting polymer (I) powder was subjected to pressure-molding in the same manner as in Example 1 to form a flexible and tough resin molding.

EXAMPLE 7

The polymer (II) powder was prepared from 3.12 parts of dibutyl succinylsuccinate and 1.14 parts of cyclohexane diamine in the similar way as in Example 1. The polymer (I) powder was obtained by oxidizing thus prepared polymer (II) powder in the same manner as in Example 3. This polymer (I) powder was subjected to the pressure-molding to form a tough resin molding.

EXAMPLE 8

A polymerization reaction of 2.28 parts of diethyl succinyl-succinate with 1.38 parts of xylylene diamine, both dissolved in 40 parts of N-methyl pyrrolidone, was carried out in the similar way as in Example 1. With the addition of 6 parts of benzoquinone, thus formed polymer (II) solution was heated for 1 hour at 100° C. to oxidize the polymer (II) to the polymer (I). The reaction solution containing the resulting polymer (I) was poured into 60 parts of cold methanol to disperse the polymer (I), and filtered off. The polymer (I) cake was washed with 60 parts of water and dried to obtain red powder thereof. A tough and impact resistant resin molding was obtained from the polymer (I) powder by pressure-molding in the same manner as in Example 1.

EXAMPLE 9

One part of polymer (II) obtained in Example 6 was dispersed into 20 parts of ethanol, and into the resulting dispersion were added 0.25 part of sodium nitrobenzene-m-sulphonate, 0.1 part of sodium hydroxide and 1 part of water. The slurry of the polymer formed by heating the resulting reaction mixture at 80° C. for 2 hours was filtered, washed and dried to obtain the polymer powder showing the characteristic IR- absorption spectrum inherent to the polymer (I). The resulting polymer (I) powder was subjected to the pressure-molding in the same manner as in Example 1 to obtain flexible and tough resin molding.

We claim:
1. A thermoplastic polymer consisting essentially of recurring structural units of the formula

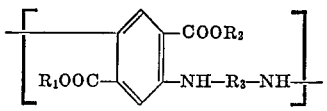

wherein $R_1$ and $R_2$ are alkyl radicals selected from the group consisting of methyl, ethyl, propyl and butyl, and $R_3$ is a divalent radical selected from the group consisting of $C_4$–$C_{12}$ alkylenes,

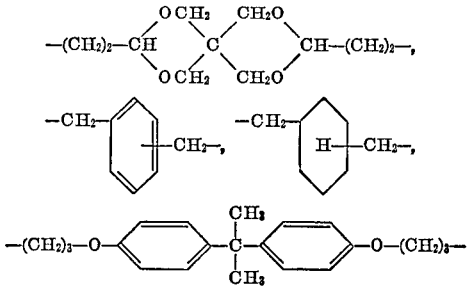

and

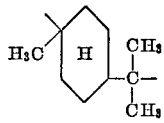

2. A process for producing a thermoplastic polymer comprising, heating powder of a first polymer consisting essentially of recurring structural units of the formula

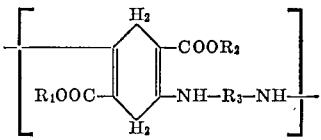

wherein $R_1$ and $R_2$ are selected from the group consisting of methyl, ethyl, propyl and butyl, and $R_3$ is a divalent radical selected from the group consisting of $C_4$–$C_{12}$ alkylenes,

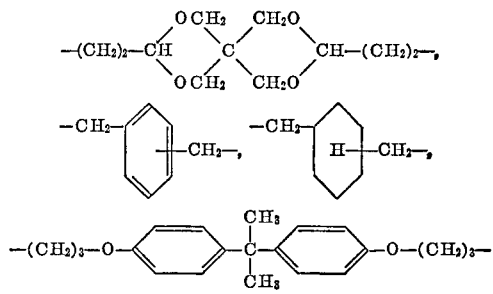

and

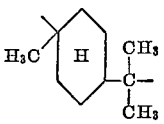

at a temperature in the range of from 80 to 200° C., under a fluidized state in air, thereby oxidizing the first polymer with the air to form a second polymer consisting essentially of recurring structural units of the formula

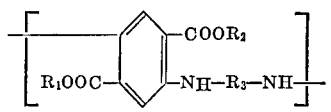

wherein $R_1$, $R_2$ and $R_3$ are the same as set forth above, and recovering the resulting second polymer.

3. A process for producing a thermoplastic polymer comprising, heating a solution of a first polymer in N-methylpyrrolidone, with an oxidizing agent selected from the group consisting of benzoquinone, sodium nitrobenzene-m-sulfonate, chloranil and iodine, said first polymer consisting essentially of recurring structural units of formula

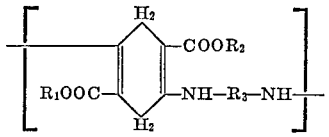

wherein $R_1$ and $R_2$ are selected from the group consisting of methyl, ethyl, propyl and butyl, and $R_3$ is a divalent radical selected from the group consisting of $C_4$–$C_{12}$ alkylenes,

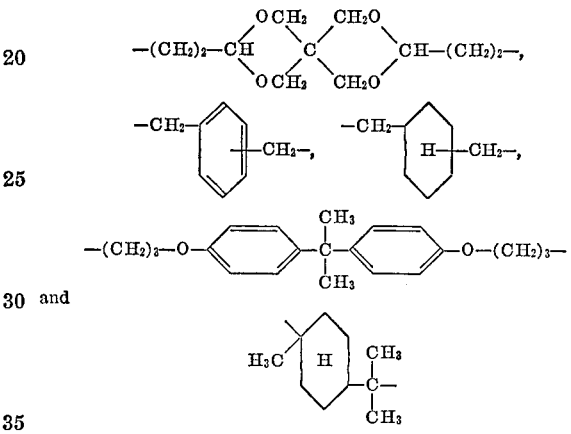

and

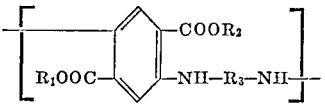

at a temperature effective to oxidize said first polymer to form a second polymer consisting essentially of recurring structural units of the formula

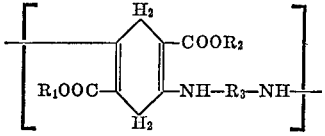

wherein $R_1$, $R_2$ and $R_3$ are the same as set forth above, and recovering the resulting polymer solution.

4. A process for producing a thermoplastic polymer comprising, dispersing a first polymer into a medium selected from the group consisting of methanol, ethanol, ethylene glycol, dimethylformamide and dimethylsulfoxide, said first polymer consisting essentially of recurring structural units of the formula

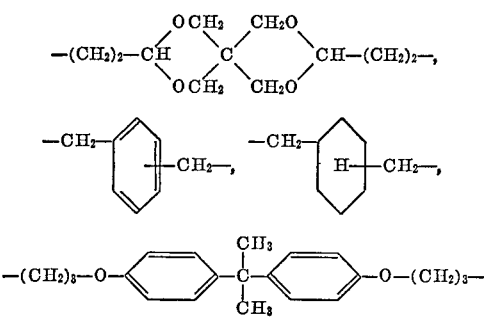

wherein $R_1$ and $R_2$ are selected from the group consisting of methyl, ethyl, propyl and butyl, and $R_3$ is a divalent radical selected from the group consisting of $C_4$–$C_{12}$ alkylenes,

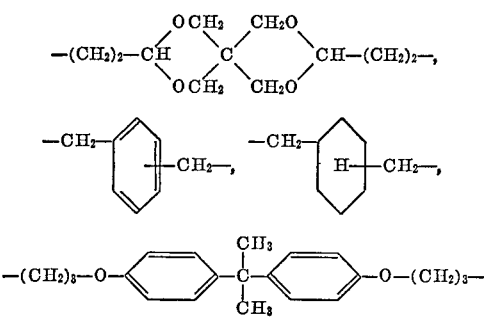

and

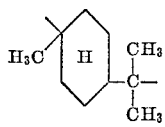

heating the resulting dispersion with an oxidizing agent selected from the group consisting of benzoquinone, sodium nitrobenzene-m-sulfonate, chloranil and iodine, at a temperature effective to oxidize said first polymer to form a second polymer consisting essentially of recurring structural units of the formula

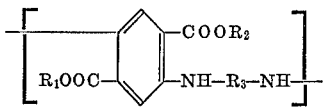

wherein $R_1$, $R_2$ and $R_3$ are the same as set forth above, and recovering the resulting second polymer.

5. The process according to claim 2, wherein the first polymer is a polymer obtained by polymerization reaction between a succinylsuccinate of the formula

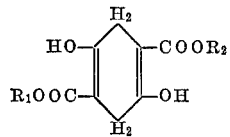

and a diamine of the formula

6. The process according to claim 3, wherein the first polymer is a polymer obtained by polymerization reaction between a succinylsuccinate of the formula

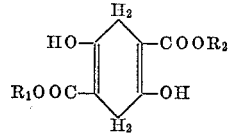

and a diamine of the formula

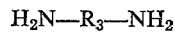

7. The process according to claim 4, wherein the first polymer is a polymer obtained by polymerization reaction between a succinylsuccinate of the formula

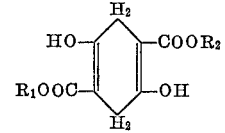

and a diamine of the formula

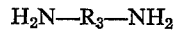

References Cited
UNITED STATES PATENTS

| | | | |
|---|---|---|---|
| 3,426,044 | 2/1969 | Sparks et al. | 260—346.6 |
| 3,635,888 | 1/1972 | Adachi et al. | 260—47 |

WILLIAM H. SHORT, Primary Examiner

L. L. LEE, Assistant Examiner

U.S. Cl. X.R.

117—124 E, 132 B; 161—192; 260—30.2, 78 TF, 78.4 E